000
United States Patent [19]

Ueno et al.

[11] 4,379,892
[45] Apr. 12, 1983

[54] METHOD FOR PREVENTION OF LOSS OF TRANSPARENCY OF POLYARYLENE ESTER BLENDS

[75] Inventors: Katsuzi Ueno, Hirakata; Takashi Maruyama, Toyonaka; Haruo Suzuki, Ibaraki; Teruo Saito, Takatsuki, all of Japan

[73] Assignee: Sumitomo Chemical Company, Limited, Osaka, Japan

[21] Appl. No.: 251,071

[22] Filed: Apr. 6, 1981

Related U.S. Application Data

[63] Continuation of Ser. No. 46,672, Jun. 8, 1979, abandoned, which is a continuation of Ser. No. 847,911, Nov. 2, 1977, abandoned.

[30] Foreign Application Priority Data

Nov. 2, 1976 [JP] Japan ................................. 51-132041

[51] Int. Cl.³ ........................ C08L 67/00; C08L 69/00
[52] U.S. Cl. .................................. 525/439; 525/389; 525/444
[58] Field of Search ....................... 525/439, 444, 389

[56] References Cited

U.S. PATENT DOCUMENTS

| | | | |
|---|---|---|---|
| 3,792,115 | 2/1974 | Kishikawa et al. | 525/439 |
| 3,792,118 | 2/1974 | Kishikawa et al. | 525/132 |
| 3,946,091 | 3/1976 | Sakata et al. | 525/68 |
| 4,166,899 | 9/1979 | Maruyama et al. | 528/480 |

FOREIGN PATENT DOCUMENTS

| | | |
|---|---|---|
| 2654923 | 6/1977 | Fed. Rep. of Germany . |
| 1002545 | 8/1965 | United Kingdom ................ 525/439 |

*Primary Examiner*—J. Ziegler
*Attorney, Agent, or Firm*—Birch, Stewart, Kolasch & Birch

[57] ABSTRACT

A method for prevention of loss of transparency of shaped articles prepared from a polyarylene ester blend comprising a polyarylene ester and other thermoplastic resin when treated with steam or boiling water, which comprises reducing the sodium content of the blend to less than 70 ppm.

6 Claims, No Drawings

METHOD FOR PREVENTION OF LOSS OF TRANSPARENCY OF POLYARYLENE ESTER BLENDS

This application is a continuation of copending application Ser. No. 46,672, filed on June 8, 1979, abandoned, which is a continuation of Ser. No. 847,911, filed Nov. 2, 1977, which is now abandoned.

BACKGROUND OF THE INVENTION

1. Field of the Invention

The present invention relates to improved polyarylene ester blends (hereinafter, referred to as "APC-blends") and to a method for enabling shaped articles prepared from APC-blends to be treated with hot water or steam without loss of the transparency thereof.

2. Description of the Prior Art

It is known that APC-blends, one component of which is a polyarylene ester (hereinafter, referred to as "APC") and another component of which is an other thermoplastic resin such as polyalkylene terephthalate or polycarbonate, have various advantageous properties compared with each of the components and other thermoplastic resin blends. APC-blends are successfully processed into various shaped articles, which have various advantages over shaped articles prepared from the APC alone or other thermoplastic resin. (cf. British Pat. No. 1,002,545, U.S. Pat. No. 3,792,115 and U.S. Pat. No. 3,792,118). One of the desirable properties of the shaped articles prepared from APC-blends is the excellent transparency. However, it has been found that the shaped articles prepared from APC-blends lose their transparency and become opaque when treated under conditions of a high temperature and a high moisture, particularly with steam. Therefore, APC-blends can not be used for the preparation of shaped articles which are required to retain the transparency thereof even when treated with hot water or steam.

This disadvantage of APC-blends is a serious problem in the preparation of shaped articles, particularly in the preparation of medical instruments such as containers for eye medicine or transfusion, because such medical instruments are sterilized with steam or boiling water and are required to be transparent.

SUMMARY OF THE INVENTION

As the result of the present inventors' intensive study, it has been found that the occurrence of said phenomenon, i.e. loss of transparency of the resin by the treatment thereof with steam or boiling water, can be avoided by reducing the content of sodium in APC-blends to less than 70 ppm, preferably 50 ppm. When shaped articles are prepared from the APC-blends having a sodium content of less than 70 ppm, they do not lose the transparency even when treated with steam or boiling water.

An object of the present invention is to provide a method for the prevention of loss of transparency of APC-blends owing to the treatment thereof under a high temperature and a high moisture.

Another object of the invention is to provide an improved APC which can be blended with other thermoplastic resins without losing the transparency by the treatment thereof under the conditions of a high temperature and a high moisture.

A further object of the invention is to provide APC-blends comprising an APC and a thermoplastic resin, which show no loss of transparency by the treatment under the conditions of high temperature and high moisture.

These and other objects of the invention will be apparent from the following description.

According to the present invention, the improved APC-blends can be prepared by blending APC with a thermoplastic resin, such as polyester, polycarbonate or a mixture thereof so that the content of sodium in the APC-blend becomes less than 70 ppm.

APC used as one component of APC-blends is disclosed in U.S. Pat. No. 3,792,118 and can be prepared by conventional processes.

The APC is a polyester prepared from a divalent phenol or its derivative and an aromatic dicarboxylic acid or its derivative.

The divalent phenol is represented by the following formula:

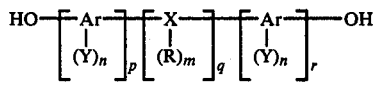

wherein Ar is an aromatic ring (e.g. phenylene, biphenylene, naphthylene), R is hydrogen, alkyl (e.g. methyl, ethyl), haloalkyl (e.g. chloromethyl, chloroethyl, bromomethyl), aryl (e.g. phenyl, naphthyl), haloaryl (e.g. chlorophenyl, bromophenyl), aralkyl (e.g. benzyl, phenylethyl), haloaralkyl (e.g. chlorobenzyl), alkyl-substituted aryl (e.g. tolyl, xylyl), alkyl-substituted haloaryl (e.g. chloromethylphenyl, bromomethylphenyl), cycloalkyl (e.g. cyclohexyl, cycloheptyl) or halocycloalkyl (e.g. chlorocyclopentyl, chlorocyclohexyl), X is alkylene (e.g. methylene, ethylene, propylene), alkylidene (e.g. ethylidene, propylidene, isopropylidene), a chain or two or more alkylenes or alkylidenes linked through an aromatic ring, a t-amino group, an oxygen atom, a carbonyl group or a sulfur-containing group (e.g. thio, sulfoxy, sulfone), an alicyclic group, a sulfur-containing group (e.g. thio, sulfoxy, sulfone), an oxygen atom, a carbonyl group or a t-amino group, Y is halogen, nitro or the group represented by R' or OR' (R' being the same as R), m is 0 or an integer not more than the number of hydrogen atoms replaceable on X, n is 0 or an integer not more than the number of hydrogen atoms replaceable on Ar, p is an integer of 1 or more, q is 0 or 1 and r is 0 or an integer of 1 or more, r being not 0 when q is 1.

In the above formula, when two or more substituents Y are present, they may be the same or may be different from each other. That is the same in the case of the substituent R or R'. The hydroxyl group on the aromatic ring may be present at any position with respect to the substituent Y, i.e. the ortho, meta or para position.

Examples of the divalent phenol are bis(4-hydroxyphenyl)methane, bis(4-hydroxy-3-methylphenyl)methane, bis(4-hydroxy-3,5-dichlorophenyl)methane, bis(4-hydroxy-3,5-dibromophenyl)methane, bis(4-hydroxy-3,5-difluorophenyl)-methane, bis(4-hydroxyphenyl)ketone, bis(4-hydroxyphenyl)-sulfide, bis(4-hydroxyphenyl)sulfone, 4,4'-dihydroxydiphenyl ether, 1,1-bis(4-hydroxyphenyl)ethane, 2,2-bis(4-hydroxyphenyl)propane, 2,2-bis(4-hydroxy-3-methylphenyl)-propane, 2,2-bis(4-hydroxy-3-chlorophenyl)propane, 2,2-bis(4-hydroxy-3,5-dichlorophenyl)propane, 2,2-bis(4-hydroxynaphthyl)propane, bis(4-hydroxyphenyl)-phenylmethane, bis(4-hydroxyphenyl)-diphenylmethane, bis(4-hydroxyphenyl)-4'-methylphenylmethane, 1,1-bis(4-hydroxyphenyl)-2,2,2-trichloroethane, bis(4-hydroxyphenyl)-(4'-chlorophenyl)methane, 1,1-bis(4-hydroxyphenyl)cyclohexane, bis(4-hydroxyphenyl)cyclohexylmethane, 4,4'-dihydroxydiphenyl, 2,2'-dihydroxydiphenyl, 2,6-dihydroxynaphthalene, hydroquinone, resorcinol, 2,6-dihydroxytoluene, 2,6-dihydroxychlorobenzene, 3,6-dihydroxytoluene, etc. These divalent phenols may be used alone or in combination.

The divalent phenol may be used in the form of a diester such as dialkyl ester or diphenyl ester. Such diester derivatives may be also used alone or in combination.

The aromatic dicarboxylic acid is represented by the following formula:

HOOC—Ar'—COOH wherein Ar' is arylene (e.g. o-phenylene, m-phenylene, p-phenylene, naphthylene) substituted or not substituted with alkyl or halogen. The dicarboxylic acids may be used alone or in combination.

The dicarboxylic acid may be used in the form of dichloride or diester such as dialkyl ester or diphenyl ester. Such derivatives may be also used alone or in combination.

The preparation of the APC from the divalent phenol or its derivative and the aromatic dicarboxylic acid or its derivative may be executed by interfacial condensation polymerization, solution condensation polymerization, melt condensation polymerization or the like.

Among the processes for producing APC, the interfacial polymerization process is the most suitable taking into consideration of the quality of the product. In fact, most commercially available APCs are prepared by this interfacial polymerization process.

According to the interfacial polymerization process, APC is prepared, for example, by mixing an aqueous solution of a bisphenol and sodium hydroxide with a solution of an aromatic dicarboxylic acid chloride in an organic solvent and vigorously agitating the mixture. When the polymerization reaction is finished, the reaction mixture is separated into two layers (1) an aqueous layer containing predominantly inorganic salts and (2) an oily layer containing predominantly the produced polymer. The oily layer contains water in an emulsion state which can not be separated by allowing the mixture to stand, and in which sodium chloride and sodium hydroxide are dissolved. The sodium content of APC can be reduced by sufficiently washing the oil layer. A particularily preferred process for producing APC having such a small sodium content as mentioned above is disclosed in German Patent Publication (Offenlegungsschrift) No. 2,654,923 date June 16, 1977.

The polyesters used as another component of APC-blends of the present invention include polyalkylene terephthalates (e.g. polyethylene terephthalate, polypropylene terephthalate, polybutylene terephthalate, hexamethylene terephthalate, etc), modified polyalkylene terephthalates thereof wherein some parts of the diol residues are replaced with other diols (e.g. 1,4-cyclohexanedimethanol, 2,2-bis(4-β-hydroxyethoxyphenyl)propane, etc.), divalent phenols (e.g. hydroquinone, resorcin, 2,2-bis(4-hydroxyphenyl)propane, etc.), or diamines (m-phenylene-diamine, p-phenylene-diamine, tolylenediamine, bis(aminophenyl)methane, etc). They also include polyalkylene naphthalates (e.g. polyethylene-2,6-naphthalate) and polyalkylene oxybenzoates (e.g. polyethylene oxybenzoate). These polyesters are known and can preferably be prepared by bulk a polymerization process. The polymerization is usually carried out in the presence of a sodium compound (e.g. sodium carbonate, sodium bicarbonate, sodium alkoxides, sodium phenoxide, sodium salts of carboxylic acids, sodium phosphate, etc.) as a catalyst. Accordingly, the polyesters produced by the polymerization process usually contain sodium derived from these sodium compounds. In order to reduce the sodium content in the polyesters, the polymerization is carried out by reducing the amount of each sodium catalyst as low as possible or by using no sodium catalyst.

The polycarbonates used in the present invention are also known and commercially available. Some examples are the polycarbonates marketed under the trade mark "IUPILON" by Mitsubishi Gas Chemical Co. or "PANLITE" by Teijin Chemicals Limited. These commercially available polycarbonates are usually prepared by the interfacial polymerization process from a divalent phenol or its derivative as mentioned hereinbefore and phosgene or its derivative such as diarylcarbonate (e.g. biphenylcarbonate). The polycarbonates prepared by this process also contain a certain amount of sodium. The sodium content of the polycarbonates can also be reduced in the same manner as disclosed with respect to APC hereinbefore. The amount of the polyesters and the polycarbonates to be blended with APC varies with the kind of the desired shaped articles, molding process and the like, but they are usually blended with APC in an amount of 2–90% by weight, preferably 10–90% by weight based on the total weight of the two components of the APC-blends.

The blending may be carried out by any conventional method, for instance, by mixing with an extruder or by blending both solutions thereof.

The APC-blends of the present invention can be used for various purposes, that is, they can be used for preparing various formed products, for instance, electric and electronic parts, such as comb for hair dryer, fan for heating apparatus, relay cover, fuse cover, or solenoid valve box; machine parts, such as parts for gas water heater or boiler; medical instruments, such as container for eye medicine or transfusion; vessels for foodstuffs, such as pudding or soft bean jelly. The APC-belnds are particularly useful for products which are treated under conditions of high temperature and high moisture, i.e. at a high temperature and a high humidity, or in steam or hot water.

The present invention is illustrated by the following Examples, but is not limited thereto. In the Examples, "part" means part by weight.

EXAMPLE 1

In a vessel with a jacket provided with a stirrer, sodium hydroxide (12.6 parts) and hydrosulfite (0.3 part) were dissolved in water (750 parts), and therein were further dissolved 2,2-bis(4-hydroxyphenyl)propane (bisphenol A) (34.2 parts), trimethyl benzyl ammonium chloride (0.17 part) and ortho-phenylphenol (0.46 part), and the temperature of the mixture was regulated to 10° C. Separately, terephthaloyl chloride and isophthaloyl chloride (each 15.2 parts) were dissolved in methylene chloride (462 parts), and the mixture was also regulated to a temperature of 10° C. This solution of acid chloride in methylene chloride was rapidly added with vigorous agitation to the above solution of bisphenol A in an alkali aqueous solution.

After the addition, the mixture was continuously agitated for 2 hours. After stopping the agitation, the reaction mixture was allowed to stand to separate it into a methylene chloride layer (oily layer) and an aqueous layer. When the metylene chloride layer was analyzed with gas chromatography, the layer contained water of 40% by weight based on the weight of methylene chloride. After removing the aqueous layer, to the oily layer were added methanol (200 parts) and concentrated hydrochloric acid (1 part). The mixture was vigorously agitated for 20 minutes and then allowed to stand to separate into a polymer solution layer (lower layer) and a layer comprising predominantly methanol (upper layer).

After removing the upper layer, to the lower layer was added methanol (100 parts) to isolate the polymer (APC). The polymer thus produced had sodium content of 23 ppm.

The polymer was dry-blended with various thermoplastic resins as shown in the following Table 1, and the blends (APC-blends) were granulated with an extruder to form pellets. The pellets were pressed to prepare sheet-like samples (thickness: 3 mm, length: 50 mm, width: 10 mm). The pressed sheet-like samples were treated with steam at 120° C. for 20 minutes, and the appearance thereof was observed. As the result, there was observed no change of appearance thereof. Besides, pressed sheet-like samples prepared likewise from the various APC-blends as shown in Table 1 were dipped in a hot water of 95° C. for 30 hours, and the appearance thereof was observed. As the result, no change of appearance was observed, either.

TABLE 1

| Composition | APC-blends | | Na-content in APC-blend (ppm) |
|---|---|---|---|
| 1 | APC (100 parts) | Polyethylene terephthalate (20 parts) | 24 |
| 2 | APC (100 parts) | Polycarbonate (100 parts) | 34 |
| 3 | APC (100 parts) | Polybutylene terephthalate (10 parts) | 23 |

REFERENCE EXAMPLE 1

In the same manner as described in Example 1, the polymerization reaction was carried out except that the agitation was carried out more vigorously and further the reaction was carried out at 30° C. for 4 hours. After stopping the agitation, the water content of the oily layer was measured likewise. As the result, the water content of the oily layer was 60% by weight based on the weight of methylene chloride.

After removing the aqueous layer, the oily layer was washed with a hydrochloric acid of pH 2, and further washed with water until the mixture became neutral. The methylene chloride was distilled off from the oily layer until the concentration of the polymer became about 40% by weight. The resulting mixture was crushed with a kneader to give a polymer. The polymer thus produced had a sodium content of 233 ppm.

The APC thus produced (100 parts) was blended with polyethylene terephthalate (20 parts), and a pressed sheet-like sample was prepared from the blend in the same manner as described in Example 1. When the sheet-like sample was treated with steam, likewise, the appearance of the sample changed from transparent to opaque, that is, the sample lost the transparency.

REFERENCE EXAMPLE 2

To the APC-blends obtained in Example 1 was added 150 ppm of sodium chloride and the mixture was kneaded. They were pressed to prepare sheet-like samples, which were treated with steam, in the same manner as in Example 1. As the result, the pressed sheet-like samples, which were transparent before the treatment with steam, became opaque after the treatment with steam, that is, the samples lost the transparency.

What is claimed is:

1. A polyarylene ester blend consisting essentially of: (a) a polyarylene ester prepared by an interfacial polymerization process comprising mixing an aqueous solution of a bisphenol and an effective catalytic amount of sodium hydroxide with a solution of an aromatic dicarboxylic acid chloride in an organic solvent and vigorously agitating the mixture and (b) a thermoplastic polyester resin, said blend having present a sodium content of less than 70 ppm and being capable of forming a transparent shaped article which can be treated under conditions of high temperature and high moisture without loss of transparency.

2. The polyarylene ester blend according to claim 1, wherein the thermoplastic resin is contained in an amount of 2-90% by weight based on the total weight of the blend.

3. The polyarylene ester blend according to claim 2, wherein the sodium is present in an amount less than 50 ppm.

4. A process for preparing a transparent shaped article, which can be treated under conditions of high temperature and high moisture without loss of the transparency thereof, from a polyarylene ester blend comprising: blending (a) a polyarylene ester which is prepared by interfacial polymerization comprising the steps of mixing an aqueous solution of a bisphenol and an effective catalytic amount of sodium hydroxide with a solution of an aromatic dicarboxylic acid chloride in an organic solvent, vigorously agitating the mixture, separating the mixture into two layers including an aqueous layer and an oily layer and washing the oily layer, thereby reducing the sodium content of produced polymer with (b) a thermoplastic polyester resin; and molding the polyarylene ester blend into a shaped article which has present a sodium content of less than 70 ppm.

5. The process according to claim 4, wherein the polyarylene ester blend is molded into a shaped article which has present a sodium content of less than 50 ppm.

6. A transparent molded article having present a sodium content of less than 70 ppm, which can be treated under conditions of high temperature and high moisture without loss of transparency, consisting essentially of: (a) a polyarylene ester prepared by an interfacial polymerization process comprising mixing an aqueous solution of a bisphenol and an effective catalytic amount of sodium hydroxide with a solution of an aromatic dicarboxylic acid chloride in an organic solvent and vigorously agitating the mixture and (b) a thermoplastic polyester resin.

* * * * *